(12) United States Patent
Song et al.

(10) Patent No.: US 12,554,708 B2
(45) Date of Patent: *Feb. 17, 2026

(54) SYSTEM, METHOD, AND COMPUTER PROGRAM PRODUCT FOR GENERATING CODE TO RETRIEVE AGGREGATION DATA FOR MACHINE LEARNING MODELS

(71) Applicant: Visa International Service Association, San Francisco, CA (US)

(72) Inventors: Hongqin Song, Austin, TX (US); Yu Gu, Austin, TX (US); Roger Cheng-Chung Huang, Round Rock, TX (US); Ran Xu, Austin, TX (US); Shawn Johnson, Georgetown, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,385

(22) Filed: Mar. 13, 2024

(65) Prior Publication Data
US 2024/0220490 A1 Jul. 4, 2024

Related U.S. Application Data

(63) Continuation of application No. 17/640,420, filed as application No. PCT/US2019/049790 on Sep. 5, 2019, now Pat. No. 11,960,480.

(51) Int. Cl.
*G06F 16/00* (2019.01)
*G06F 16/242* (2019.01)
(Continued)

(52) U.S. Cl.
CPC ........ *G06F 16/244* (2019.01); *G06F 16/2457* (2019.01); *G06F 16/284* (2019.01)

(58) Field of Classification Search
CPC .... G06F 16/13; G06F 16/212; G06F 16/2455; G06F 16/9535; G06F 21/554;
(Continued)

(56) References Cited

U.S. PATENT DOCUMENTS 7,970,701 B2 6/2011 Lewis et al.
8,887,281 B2 11/2014 Honig et al.
(Continued)

FOREIGN PATENT DOCUMENTS

CN 101645010 A 2/2010
CN 107133862 A 9/2017
(Continued)

OTHER PUBLICATIONS

Backhouse et al., "Machine Learning with Business Rules on IBM Z: Acting on Your Insights", IBM Redbooks, 2018, 44 pages.
(Continued)

*Primary Examiner* — Shyue Jiunn Hwa
(74) *Attorney, Agent, or Firm* — The Webb Law Firm

(57) ABSTRACT

Provided is a system that includes at least one processor programmed or configured to receive an XML data file, wherein the XML data file includes data associated with one or more input parameters of a machine learning model, generate a code generation template based on the data associated with one or more input parameters of the machine learning model included in the XML file, where the code generation template includes one or more keys associated with one or more parameters of a transaction aggregate for an account of a user, and generate a file of executable code based on the code generation template, wherein the file of executable code includes instructions that, when executed by at least one processor, causes at least one processor to retrieve transaction aggregate data associated with the trans-
(Continued)

action aggregate for the account of the user. A method and computer program product are also provided.

20 Claims, 8 Drawing Sheets

(51) Int. Cl.
*G06F 16/2457* (2019.01)
*G06F 16/28* (2019.01)

(58) Field of Classification Search
CPC .. G06F 21/566; G06F 16/164; G06F 16/2379; G06F 16/245; G06F 16/2471; G06F 16/248; G06F 16/282; G06F 16/31; G06F 16/334; G06F 16/338; G06F 16/353; G06F 16/367; G06F 16/40; G06F 16/9024; G06F 16/93; G06F 16/951; G06F 16/9536; G06F 16/9538; G06F 3/048; G06F 8/00; G06F 8/31; G06F 8/65; G06F 16/244; G06F 16/2457; G06F 16/284; G06F 16/24542; G06F 16/90335; G06Q 20/10; G06Q 20/34; H04L 63/08; H04L 67/02; H04L 67/306; G06N 20/00
See application file for complete search history.

(56) References Cited

U.S. PATENT DOCUMENTS

| | | | |
|---|---|---|---|
| 9,348,920 | B1 | 5/2016 | Kesin |
| 12,260,460 | B1* | 3/2025 | Ironside ............ G06F 18/24323 |
| 2004/0243588 | A1 | 12/2004 | Tanner et al. |
| 2009/0326998 | A1 | 12/2009 | Watkins et al. |
| 2013/0031633 | A1 | 1/2013 | Honig et al. |
| 2013/0204894 | A1 | 8/2013 | Faith et al. |
| 2013/0290234 | A1 | 10/2013 | Harris et al. |
| 2018/0089591 | A1 | 3/2018 | Zeiler et al. |
| 2019/0236598 | A1 | 8/2019 | Padmanabhan |
| 2019/0265971 | A1* | 8/2019 | Behzadi .................. H04L 67/61 |
| 2020/0394552 | A1* | 12/2020 | Ganapavarapu ...... H04L 63/123 |

FOREIGN PATENT DOCUMENTS

| | | |
|---|---|---|
| CN | 107430613 A | 12/2017 |
| WO | 2013082190 A1 | 6/2013 |

OTHER PUBLICATIONS

Cheng, "Artificial Intelligence and auto-generation of code", Haaga-Helia University of Applied Sciences, May 2018, 40 pages.
Klein et al., "Model-Driven Engineering: Automatic Code Generation and Beyond", CMU/SEI, 2015, 51 pages.

* cited by examiner

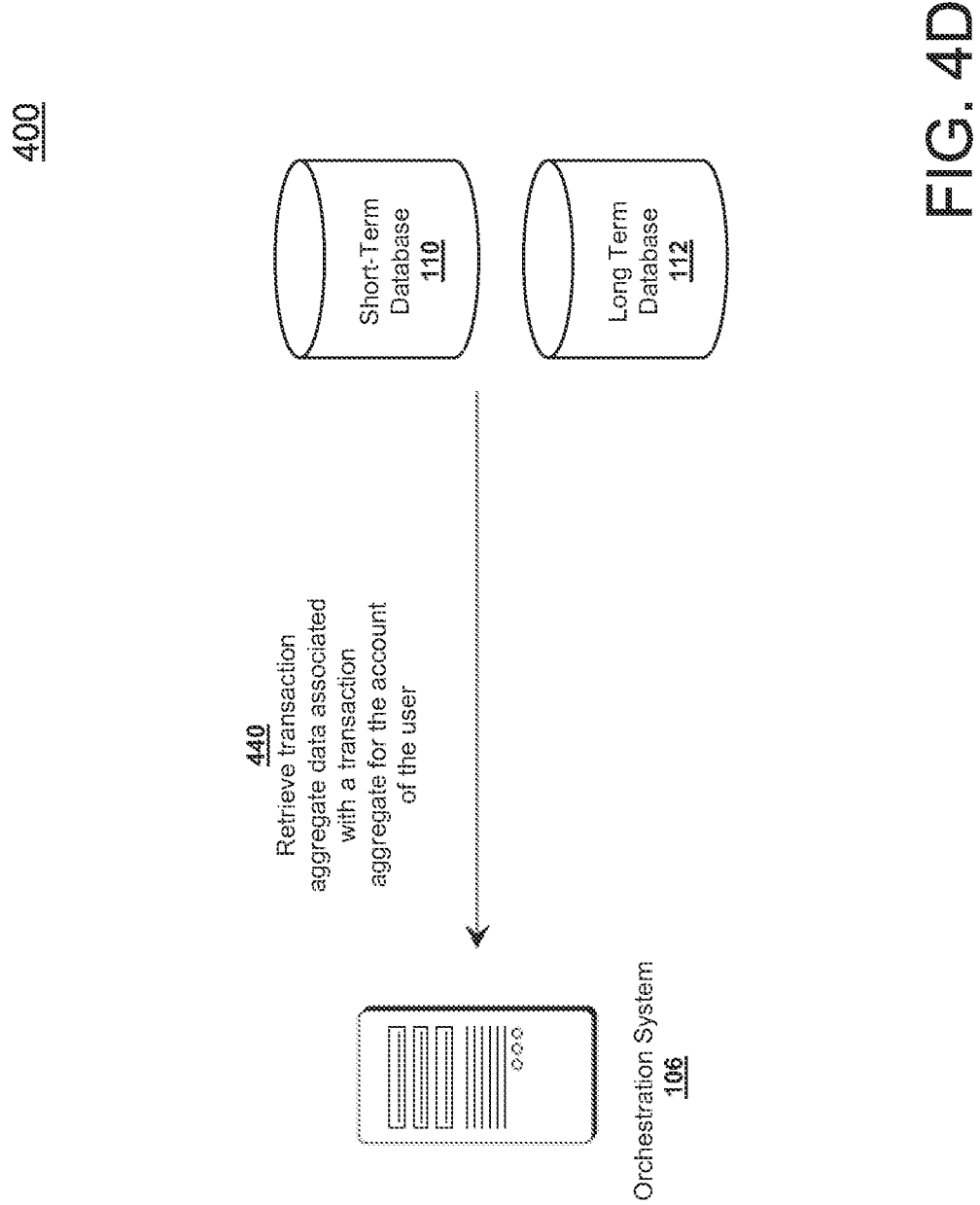

SYSTEM, METHOD, AND COMPUTER PROGRAM PRODUCT FOR GENERATING CODE TO RETRIEVE AGGREGATION DATA FOR MACHINE LEARNING MODELS

CROSS REFERENCE TO RELATED APPLICATIONS

This application is a continuation application of U.S. patent application Ser. No. 17/640,420, filed Sep. 5, 2019, which is the United States national phase of International Application No. PCT/US2019/049790 filed Sep. 5, 2019, the entire disclosures of which are hereby incorporated by reference in their entirety.

BACKGROUND

1. Technical Field

This disclosure relates generally to machine learning models and, in some non-limiting aspects or embodiments, to systems, methods, and computer program products for generating transaction aggregations associated with predictions for transactions that may be used with a machine learning model.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

In some instances, a machine learning model, such as a predictive machine learning model, may be used to make a prediction associated with a risk or an opportunity. A predictive machine learning model may be used to analyze a relationship between the performance of a unit based on data associated with the unit and one or more known features of the unit.

In some examples, a predictive machine learning model may require an input that includes features that are based on an aggregation of data (e.g., aggregation data). For example, the predictive machine learning model may require an input that includes features that are based on aggregation data that is calculated in real-time. However, calculating the aggregation data in real-time may be very resource intensive and may require a large amount of time to calculate.

Further, a machine learning model developed for one set of data may not be applicable to a certain problem in another set of data. For example, a machine learning model developed for a first data set associated with a particular geographic area and/or demographic may not be applicable to a certain prediction in a second set of data associated with a different geographic area and/or demographic. This may lead to the creation of a large number of machine learning models developed for each set of data and also a large amount of data for each machine learning model.

SUMMARY

Accordingly, disclosed are systems, methods, and computer program products for generating code to retrieve aggregation data for machine learning models.

According to some non-limiting aspects or embodiments, provided is a system, comprising: at least one processor programmed or configured to: receive an Extensible Markup Language (XML) data file, wherein the XML data file comprises data associated with one or more input parameters of a machine learning model; generate a code generation template based on the data associated with one or more input parameters of the machine learning model included in the XML file, where the code generation template comprises one or more keys associated with one or more parameters of a transaction aggregate for an account of a user, wherein the one or more parameters of the transaction aggregate for the account of the user are based on one or more parameters of a plurality of payment transactions involving the account of the user; and generate a file of executable code based on the code generation template, wherein the file of executable code comprises instructions that, when executed by at least one processor, causes at least one processor to retrieve transaction aggregate data associated with the transaction aggregate for the account of the user.

According to some non-limiting aspects or embodiments, provided is a computer-implemented method, comprising: receiving, with at least one processor, a data file, wherein the data file comprises data associated with one or more input parameters of a machine learning model; generating, with at least one processor, a code generation template based on the data associated with one or more input parameters of the machine learning model included in the data file, where the code generation template comprises one or more keys associated with one or more parameters of a transaction aggregate for an account of a user; generating, with at least one processor, an executable code file based on the code generation template, wherein the file of executable code comprises instructions that, when executed by at least one processor, cause the at least one processor to retrieve transaction aggregate data associated with the transaction aggregate for the account of the user.

According to some non-limiting aspects or embodiments, provided is a computer program product, comprising: at least one non-transitory computer-readable medium comprising one or more instructions that, when executed by at least one processor, cause the at least one processor to: receive a data file associated with a machine learning model; generate a code generation template based on receiving the data file associated with the machine learning model, where the code generation template comprises one or more keys associated with one or more parameters of a transaction aggregate for an account of a user, wherein the one or more parameters of the transaction aggregate for the account of the user are based on one or more parameters of a plurality of payment transactions involving the account of the user; and generate a file of executable code based on the code generation template, wherein the file of executable code comprises instructions that, when executed by the at least one processor, cause the at least one processor to retrieve transaction aggregate data associated with the transaction aggregate for the account of the user.

Further non-limiting aspects or embodiments are set forth in the following numbered clauses:

Clause 1: A system, comprising: at least one processor programmed or configured to: receive an XML data file, wherein the XML data file comprises data associated with one or more input parameters of a machine learning model; generate a code generation template based on the data associated with one or more input parameters of the machine learning model included in the XML file, where the code generation template comprises one or more keys associated with one or more parameters of a transaction aggregate for an account of a user, wherein the one or more parameters of the transaction aggregate for the account of the user are based on one or more parameters of a plurality of payment transactions involving the account of the user; and generate a file of executable code based on the code generation template, wherein the file of executable code comprises instructions that, when executed by at least one processor, cause at least one processor to retrieve transaction aggregate data associated with the transaction aggregate for the account of the user.

Clause 2: The system of clause 1, wherein the code generation template comprises a template for an SQL query and wherein the template for the SQL query comprises the one or more keys associated with one or more parameters of the transaction aggregate for the account of the user.

Clause 3: The system of clauses 1 or 2, wherein, when generating the file of executable code, the at least one processor is programmed or configured to: generate the file of executable code that, when executed by at least one processor, causes at least one processor to retrieve transaction aggregate data associated with the transaction aggregate for the account of the user from a predetermined database of a plurality of databases.

Clause 4: The system of any of clauses 1-3, wherein the at least one processor is further programmed or configured to: receive a request for risk assessment determination of a payment transaction involving the account of the user from a client device; retrieve first transaction aggregate data associated with a first transaction aggregate for the account of the user; and determine a risk assessment score associated with the payment transaction involving the account of the user using the first transaction aggregate data associated with the first transaction aggregate for the account of the user as an input to the machine learning model.

Clause 5: The system of any of clauses 1-4, wherein, when retrieving first transaction aggregate data associated with the first transaction aggregate for the account of the user, the at least one processor is programmed or configured to: retrieve short-term aggregation data associated with the first transaction aggregate for the account of the user from a short-term database; and retrieve long-term aggregation data associated with the first transaction aggregate for the account of the user from a long-term database.

Clause 6: The system of any of clauses 1-5, wherein, when retrieving the first transaction aggregate data associated with the first transaction aggregate for the account of the user, the at least one processor is programmed or configured to: retrieve the first transaction aggregate data associated with the first transaction aggregate for the account of the user from one or more databases based on executing the file of executable code.

Clause 7: The system of any of clauses 1-6, wherein, when receiving the XML file, the at least one processor is programmed or configured to: receive the XML file from a client device via a web application, and wherein the data associated with one or more input parameters of the machine learning model is based on data received via the web application.

Clause 8: A computer-implemented method, comprising: receiving, with at least one processor, a data file, wherein the data file comprises data associated with one or more input parameters of a machine learning model; generating, with at least one processor, a code generation template based on the data associated with one or more input parameters of the machine learning model included in the data file, where the code generation template comprises one or more keys associated with one or more parameters of a transaction aggregate for an account of a user; and generating, with at least one processor, an executable code file based on the code generation template, wherein the file of executable code comprises instructions that, when executed by at least one processor, cause the at least one processor to retrieve transaction aggregate data associated with the transaction aggregate for the account of the user.

Clause 9: The method of clause 8, wherein generating the file of executable code file comprises: generating the file of executable code that, when executed by at least one processor, causes at least one processor to retrieve transaction aggregate data associated with the transaction aggregate for the account of the user from a predetermined database of a plurality of databases.

Clause 10: The method of clauses 8 or 9, further comprising: receiving a request for risk assessment determination of a payment transaction involving the account of the user from a client device; retrieving first transaction aggregate data associated with a first transaction aggregate for the account of the user; and determining a risk assessment score associated with the payment transaction involving the account of the user using the first transaction aggregate data associated with the first transaction aggregate for the account of the user as an input to the machine learning model.

Clause 11: The method of any of clauses 8-10, wherein retrieving first transaction aggregate data associated with the first transaction aggregate for the account of the user comprises: retrieving short-term aggregation data associated with the first transaction aggregate for the account of the user from a short-term database; and retrieving long-term aggregation data associated with the first transaction aggregate for the account of the user from a long-term database.

Clause 12: The method of any of clauses 8-11, wherein retrieving the first transaction aggregate data associated with the first transaction aggregate for the account of the user, the at least one processor is programmed or configured to: retrieve the first transaction aggregate data associated with the first transaction aggregate for the account of the user from one or more databases based on executing the file of executable code.

Clause 13: The method of any of clauses 8-12, further comprising: determining whether the risk assessment score associated with the payment transaction involving the account of the user satisfies a risk assessment threshold; and performing an action based on determining that the risk assessment score associated with the payment transaction involving the account of the user satisfies a risk assessment threshold.

Clause 14: The method of any of clauses 8-13, wherein receiving the data file comprises: receiving an XML file from a client device via a web application, and wherein the data associated with one or more input parameters of the machine learning model is based on data received via the web application.

Clause 15: A computer program product comprising at least one non-transitory computer-readable medium comprising one or more instructions that, when executed by at least one processor, cause the at least one processor to: receive a data file associated with a machine learning model; generate a code generation template based on receiving the data file associated with the machine learning model, where the code generation template comprises one or more keys associated with one or more parameters of a transaction aggregate for an account of a user, wherein the one or more parameters of the transaction aggregate for the account of the user are based on one or more parameters of a plurality of payment transactions involving the account of the user; and generate a file of executable code based on the code generation template, wherein the file of executable code comprises instructions that, when executed by the at least one processor, cause the at least one processor to retrieve transaction aggregate data associated with the transaction aggregate for the account of the user.

Clause 16: The computer program product of clause 15, wherein the code generation template comprises a template for an SQL query and wherein the template for the SQL query comprises the one or more keys associated with one or more parameters of the transaction aggregate for the account of the user.

Clause 17: The computer program product of clauses 15 or 16, wherein, the one or more instructions that cause the at least one processor to generate the file of executable code file, cause the at least one processor to: generate the file of executable code that, when executed by at least one processor, causes at least one processor to retrieve transaction aggregate data associated with the transaction aggregate for the account of the user from a predetermined database of a plurality of databases.

Clause 18: The computer program product of any of clauses 15-17, wherein the one or more instructions further cause the at least one processor to: receive a request for risk assessment determination of a payment transaction involving the account of the user from a client device; retrieve first transaction aggregate data associated with a first transaction aggregate for the account of the user; and determine a risk assessment score associated with the payment transaction involving the account of the user using the first transaction aggregate data associated with the first transaction aggregate for the account of the user as an input to the machine learning model.

Clause 19: The computer program product of any of clauses 15-18, wherein, the one or more instructions that cause the at least one processor to retrieve the first transaction aggregate data associated with the first transaction aggregate for the account of the user, cause the at least one processor to: retrieve short-term aggregation data associated with the first transaction aggregate for the account of the user from a short-term database; and retrieve long-term aggregation data associated with the first transaction aggregate for the account of the user from a long-term database.

Clause 20: The computer program product of any of clauses 15-19, wherein, the one or more instructions that cause the at least one processor to receive the XML file, cause the at least one processor to: receive the XML file from a client device via a web application, and wherein the data associated with one or more input parameters of the machine learning model is based on data received via the web application.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting aspects or embodiments are explained in greater detail below with reference to the exemplary embodiments that are illustrated in the accompanying schematic figures, in which:

FIGS. 4A-4E are diagrams of a non-limiting embodiment of an implementation of a process for generating code to retrieve aggregation data for machine learning models.

DETAILED DESCRIPTION

Figure 1:
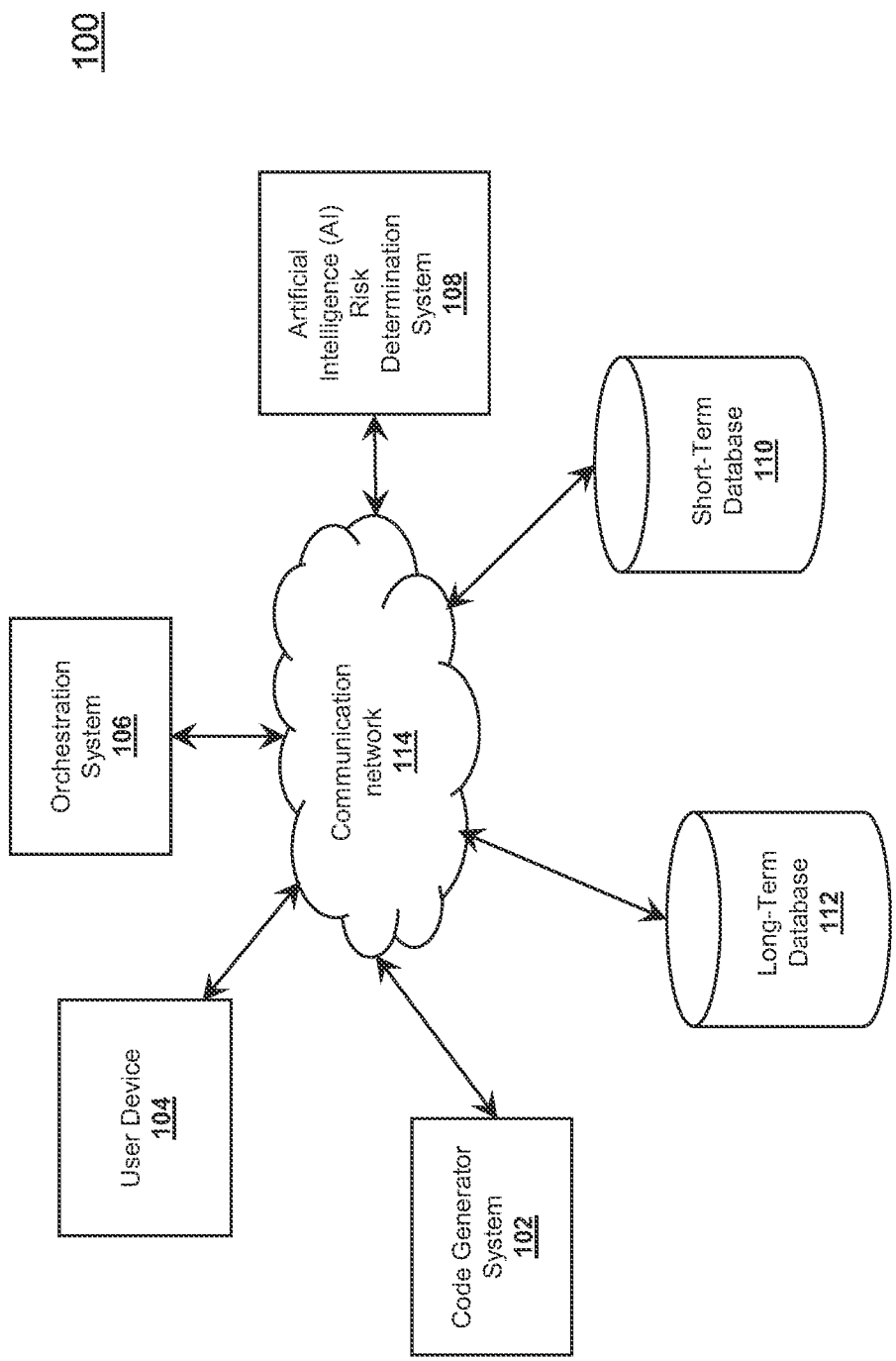
FIG. 1 is a diagram of a non-limiting aspect or embodiment of an environment in which devices, systems, methods, and/or products described herein may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, systems, computer-implemented methods, and computer program products are disclosed. For example, a system may include at least one processor programmed or configured to receive a data file associated with machine learning model, such as an XML data file. The data file may include data associated with one or more input parameters of a machine learning model. The at least one processor may be programmed or configured to generate a code generation template based on the data associated with one or more input parameters of the machine learning model included in the data file. The code generation template may include one or more keys associated with one or more parameters of a transaction aggregate for an account of a user and the one or more parameters of the transaction aggregate for the account of the user may be based on one or more parameters of a plurality of payment transactions involving the account of the user. The at least one processor may be programmed or configured to generate a file of executable code based on the code generation template. The file of executable code may include instructions that, when executed by at least one processor, cause at least one processor to retrieve transaction aggregate data associated with the transaction aggregate for the account of the user.

In this way, non-limiting embodiments of the present disclosure may allow for aggregation data to be determined that is less resource intensive and that does not require a lot of time to calculate, for example, once a request associated with the aggregation data is received. Further, non-limiting embodiments of the present disclosure may allow for the machine learning models that are created for a specific set of aggregation data and that do not require aggregation data to be recalculated during every instance of use of the machine learning model.

Referring now to FIG. 1, FIG. 1 is a diagram of an example environment 100 in which devices, systems, methods, and/or products described herein may be implemented. As shown in FIG. 1, environment 100 includes code generator system 102, user device 104, orchestration system 106, artificial intelligence (AI) risk determination system 108, short-term database 110, long-term database 112, and communication network 114. Code generator system 102, user device 104, orchestration system 106, AI risk determination system 108, short-term database 110, and long-term database 112 may interconnect (e.g., establish a connection to communicate, and/or the like) via wired connections, wireless connections, or a combination of wired and wireless connections.

Code generator system 102 may include one or more devices capable of being in communication with user device 104, orchestration system 106, artificial intelligence (AI) risk determination system 108, short-term database 110, and long-term database 112 via communication network 114. For example, code generator system 102 may include one or more computing devices, such as one or more servers and/or other like devices. In some non-limiting embodiments, code generator system 102 may be associated with a transaction service provider, as described herein. For example, code generator system 102 may be operated by a transaction service provider and/or code generator system 102 may be a component of a transaction service provider system.

User device 104 may include one or more devices capable of being in communication with code generator system 102, orchestration system 106, AI risk determination system 108, short-term database 110, and long-term database 112 via communication network 114. For example, user device 104 may include one or more computing devices, such as one or more servers, one or more client devices, one or more mobile devices, and/or other like devices. In some non-limiting embodiments, user device 104 may be associated with a transaction service provider, as described herein. For example, user device 104 may be operated by a transaction service provider and/or user device 104 may be a component of a transaction service provider system.

Orchestration system 106 may include one or more devices capable of being in communication with code generator system 102, user device 104, AI risk determination system 108, short-term database 110, and long-term database 112 via communication network 114. For example, orchestration system 106 may include one or more computing devices, such as one or more servers and/or other like devices. In some non-limiting embodiments, orchestration system 106 may be associated with a transaction service provider, as described herein. For example, orchestration system 106 may be operated by a transaction service provider and/or orchestration system 106 may be a component of a transaction service provider system.

AI risk determination system 108 may include one or more devices capable of being in communication with code generator system 102, user device 104, orchestration system 106, short-term database 110, and long-term database 112 via communication network 114. For example, AI risk determination system 108 may include one or more computing devices, such as one or more servers and/or other like devices. In some non-limiting embodiments, AI risk determination system 108 may be associated with a transaction service provider, as described herein. For example, AI risk determination system 108 may be operated by a transaction service provider and/or AI risk determination system 108 may be a component of a transaction service provider system.

Short-term database 110 may include one or more devices capable of storing data in a data structure and capable of being in communication with code generator system 102, user device 104, orchestration system 106, AI risk determination system 108, and long-term database 112 via communication network 114. For example, short-term database 110 may include one or more computing devices, such as one or more servers and/or other like devices. In some non-limiting embodiments, short-term database 110 may be a component of a system. For example, short-term database 110 may be a component of code generator system 102 and/or orchestration system 106. In some non-limiting embodiments, short-term database 110 may receive and/or store data associated with real-time (e.g., live) payment transactions. For example, short-term database 110 may receive the data associated with real-time payment transactions from a messaging system, such as Apache Kafka or IBM MQ, and short-term database 110 may store the data associated with real-time payment transactions in a data structure based on receiving the data from the messaging system.

Long-term database 112 may include one or more devices capable of storing data in a data structure and capable of being in communication with code generator system 102, user device 104, orchestration system 106, AI risk determination system 108, and short-term database 110 via communication network 114. For example, long-term database 112 may include one or more computing devices, such as one or more servers and/or other like devices. In some non-limiting embodiments, long-term database 112 may be a component of a system. For example, long-term database 112 may be a component of code generator system 102 and/or orchestration system 106. In some non-limiting embodiments, long-term database 112 may receive and/or store data associated with user profiles based on transaction data associated with payment transactions conducted by users associated with the user profiles. For example, long-term database 112 may receive the data associated with user profiles from a file system, such as an Apache Hadoop system, and long-term database 112 may store the data associated with user profiles based on receiving the data from the file system.

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
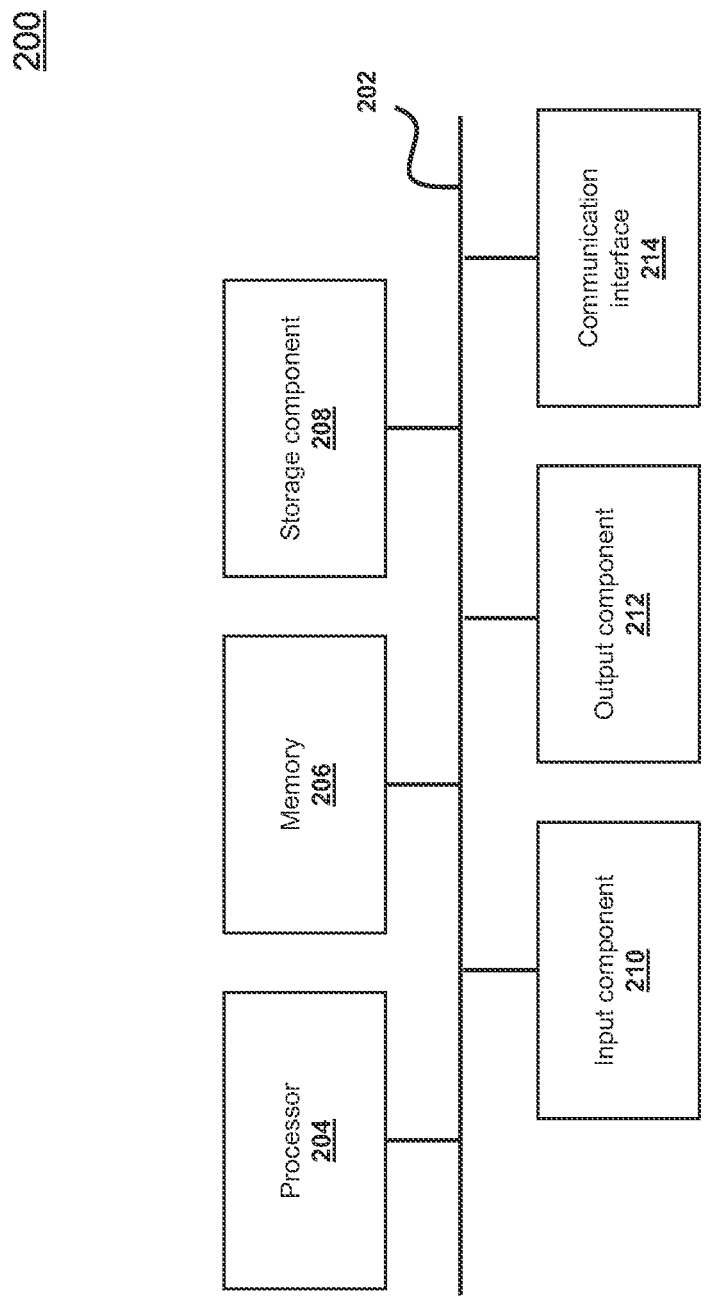
FIG. 2 is a diagram of a non-limiting aspect or embodiment of components of one or more devices and/or one or more systems of FIG. 1.

Referring now to FIG. 2, FIG. 2 is a diagram of example components of device 200. Device 200 may correspond to code generator system 102 (e.g., one or more devices of code generator system 102), user device 104, orchestration system 106 (e.g., one or more devices of orchestration system 106), AI risk determination system 108 (e.g., one or more devices of AI risk determination system 108), short-term database 110, and/or long-term database 112. In some non-limiting aspects or embodiments, code generator system 102, user device 104, orchestration system 106, AI risk determination system 108, short-term database 110, and/or long-term database 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting aspects or embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of retrieving information from, storing information in, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting aspects or embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
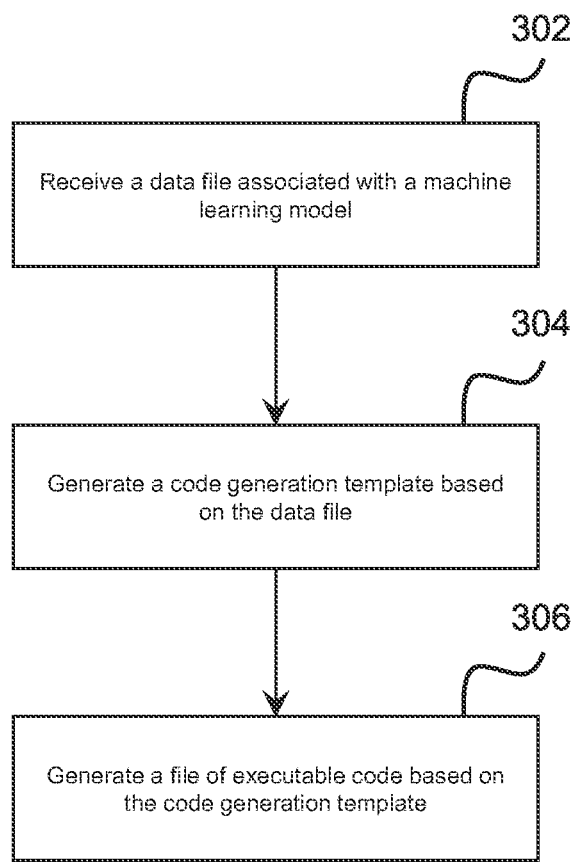
FIG. 3 is a flowchart of a non-limiting aspect or embodiment of a process for generating code to retrieve aggregation data for machine learning models.

Referring now to FIG. 3, FIG. 3 is a flowchart of a non-limiting embodiment of a process 300 for generating code to retrieve aggregation data for machine learning models. In some non-limiting aspects or embodiments, one or more of the functions described with respect to process 300 may be performed (e.g., completely, partially, and/or the like) by code generator system 102. In some non-limiting embodiments, one or more of the steps of process 300 may be performed (e.g., completely, partially, and/or the like) by another device or a group of devices separate from and/or including code generator system 102 such as, for example, user device 104, orchestration system 106, and/or AI risk determination system 108.

As shown in FIG. 3, at step 302, process 300 may include receiving a data file associated with a machine learning model. For example, code generator system 102 may receive the data file that includes one or more input parameters of a machine learning model. In some non-limiting embodiments, the one or more input parameters of the machine learning model may include one or more features associated with the machine learning model. For example, the one or more input parameters of the machine learning model may correspond to one or more features that were used to train and/or validate the machine learning model.

In some non-limiting embodiments, the one or more input parameters of the machine learning model may include one or more keys associated with one or more parameters of a transaction aggregate for an account of a user. The one or more keys associated with the one or more parameters of the transaction aggregate for the account of the user may correspond to one or more features that were used to train and/or validate the machine learning model. In some non-limiting embodiments, the machine learning model may include a risk determination machine model. For example, the machine learning model may include a risk determination machine model that is used by AI risk determination system 108 to determine a risk associated with authorization of a payment transaction conducted (e.g., a payment transaction conducted in real-time) with the account of the user.

In some non-limiting embodiments, the one or more parameters of the transaction aggregate for the account of the user may be based on one or more parameters of a plurality of payment transactions involving the account of the user. For example, the one or more parameters of the transaction aggregate may include a number of payment transactions conducted with the account of the user during a time interval, a total transaction amount of a plurality of payment transactions conducted with the account of the user during a time interval, a number of IP addresses (e.g., a number of IP addresses each associated with a different computing device) involved in a plurality of payment transactions conducted with the account of the user during a time interval, a list of IP addresses associated with (e.g., a list of IP addresses each associated with a different computing device involved in) a plurality of payment transactions conducted with the account of the user during a time interval, and/or the like.

In some non-limiting embodiments, code generator system 102 may store the one or more parameters of the transaction aggregate for the account of the user. For example, code generator system 102 may store the one or more parameters of the transaction aggregate for the account of the user as a user profile for the account of the user in long-term database 112. The one or more parameters of the transaction aggregate for the account of the user (e.g., the user profile for the account of the user) may be assigned to an account identifier of the account of the user in long-term database 112.

In some non-limiting embodiments, code generator system 102 may receive the data file from user device 104 via a web application. For example, code generator system 102 may receive the data file from user device 104 via the web application that is provided on user device 104. The data included in the data file (e.g., data associated with one or more input parameters of the machine learning model) may be based on data received via the web application. In some non-limiting embodiments, the data file may include an Extensible Markup Language (XML) data file. For example, the data file may include data in an XML data file format.

As shown in FIG. 3, at step 304, process 300 may include generating a code generation template based on the data file. For example, code generator system 102 may generate the code generation template based on the data file received from user device 104. In some non-limiting embodiments, the code generation template may include a template with fields based on the one or more input parameters of a machine learning model (e.g., a risk determination machine learning model). In some non-limiting embodiments, code generator system 102 may generate the code generation template based on the machine learning model. For example, code generator system 102 may generate the code generation template based on an identifier of the machine learning model, such as an identifier of a risk determination machine learning model. In some non-limiting embodiments, the identifier of the machine learning model may be included in the data file received from user device 104.

In some non-limiting embodiments, code generator system 102 may generate the code generation template as a template for an SQL query. For example, code generator system 102 may generate the code generation template as a template for the SQL query based on the data included in the data file received from user device 104. In some non-limiting embodiments, the template for the SQL query may include one or more keys associated with one or more parameters of a transaction aggregate for the account of the user.

As shown in FIG. 3, at step 306, process 300 may include generating a file of executable code based on the code generation template. For example, code generator 102 may generate the file of executable code based on the code generation template. The file of executable code may include instructions that, when executed, cause transaction aggregate data associated with a transaction aggregate for an account of a user to be retrieved. In some non-limiting embodiments, transaction aggregate data associated with a transaction aggregate for an account of a user may include one of more values of one or more parameters of the transaction aggregate for the account of the user. For example, the transaction aggregate data associated with the transaction aggregate for the account of the user may include a number of payment transactions conducted with the account of the user during a time interval where the number is equal to 7. In another example, the transaction aggregate data associated with the transaction aggregate for the account of the user may include a total transaction amount of a plurality of payment transactions conducted with the account of the user during a time interval where the total transaction amount of the plurality of payment transactions is equal to $534.56. In another example, the transaction aggregate data associated with the transaction aggregate for the account of the user may include a number of IP addresses involved in a plurality of payment transactions conducted with the account of the user during a time interval and the number of IP addresses is equal to 6.

In some non-limiting embodiments, code generator system 102 may store transaction aggregate data associated with a transaction aggregate for the account of the user (e.g., one of more values of the one or more parameters of the transaction aggregate for the account of the user). For example, code generator system 102 may store one or more values of the one or more parameters of the transaction aggregate for the account of the user in a user profile for the account of the user in long-term database 112. The one or more values of the one or more parameters of the transaction aggregate for the account of the user (e.g., the user profile for the account of the user) may be assigned to the account identifier of the account of the user in long-term database 112.

In some non-limiting embodiments, the file of executable code may include instructions that, when executed, cause long-term transaction aggregate data associated with a transaction aggregate for an account of a user to be retrieved from a long-term database 112. Additionally or alternatively, the file of executable code may include instructions that, when executed, cause short-term transaction aggregate data associated with a transaction aggregate for an account of a user to be retrieved from a short-term database 110.

In some non-limiting embodiments, code generator system 102 may execute the file of executable code and retrieve transaction aggregate data associated with a transaction aggregate for the account of the user from short-term database 110 and/or long-term database 112. Additionally or alternatively, orchestration system 106 and/or AI risk determination system 108 may execute the file of executable code and retrieve transaction aggregate data associated with a transaction aggregate for the account of the user from short-term database 110 and/or long-term database 112.

In some non-limiting embodiments, code generator system 102 may generate the file of executable code to include instructions that, when executed, cause the transaction aggregate data associated with the transaction aggregate for the account of the user to be retrieved from a predetermined database of a plurality of databases. For example, code generator system 102 may generate the file of executable code to include instructions that, when executed, cause the transaction aggregate data associated with the transaction aggregate for the account of the user to be retrieved from a predetermined database of short-term database 110 and long-term database 112. In some non-limiting embodiments, code generator system 102 may determine the predetermined database of the plurality of databases based on data included in the data file received from user device 104. For example, code generator system 102 may determine the predetermined database of the plurality of databases based on one or more input parameters of a machine learning model and/or one or more keys associated with one or more parameters of a transaction aggregate for an account of a user. Additionally or alternatively, code generator system 102 may determine the predetermined database of the plurality of databases based on an identifier of a machine learning model included in the data file.

In some non-limiting embodiments, orchestration system 106 may receive a request for risk assessment determination of a payment transaction involving the account of the user. For example, orchestration system 106 may receive the request for risk assessment determination of the payment transaction involving the account of the user from user device 104. In some non-limiting embodiments, the request for risk assessment determination may include an account identifier of the account of the user. In some non-limiting embodiments, orchestration system 106 may transmit the request for risk assessment determination based on receiving the request for risk assessment determination from user device 104. For example, orchestration system 106 may transmit the request for risk assessment determination to code generator system 102 based on receiving the request for risk assessment determination.

In some non-limiting embodiments, code generator system 102, orchestration system 106, and/or AI risk determination system 108 may retrieve transaction aggregate data associated with a transaction aggregate for the account of the user from short-term database 110 and/or long-term database 112. For example, orchestration system 106 may retrieve transaction aggregate data associated with a transaction aggregate from short-term database 110 and/or long-term database 112 based on the account identifier of the account of the user included in the request for risk assessment determination. In such an example, code generator system 102, orchestration system 106, and/or AI risk determination system 108 may determine a user profile that corresponds to the account identifier of the account of the user and the transaction aggregate data associated with the transaction aggregate for the account of the user may be retrieved from the user profile. In some non-limiting embodiments, code generator system 102, orchestration system 106, and/or AI risk determination system 108 may retrieve short-term aggregation data associated with the transaction aggregate for the account of the user from short-term database and/or long-term aggregation data associated with the transaction aggregate for the account of the user from long-term database 112.

In some non-limiting embodiments, code generator system 102, orchestration system 106, and/or AI risk determination system 108 may retrieve transaction aggregate data associated with a transaction aggregate for the account of the user from short-term database 110 and/or long-term database 112 based on executing the file of executable code. For example, code generator system 102, orchestration system 106, and/or AI risk determination system 108 may retrieve the transaction aggregate data associated with the transaction aggregate for the account of the user based on executing the file of executable code at a predetermined time interval. In some non-limiting embodiments, the predetermined time interval may include a daily time interval, a weekly time interval, a monthly time interval, and/or the like.

In some non-limiting embodiments, AI risk determination system 108 may determine a risk assessment score associated with the payment transaction involving the account of the user using the transaction aggregate data associated with the transaction aggregate for the account of the user. For example, AI risk determination system 108 may determine the risk assessment score using the transaction aggregate data associated with the transaction aggregate for the account of the user as an input to a risk determination machine learning model. In some non-limiting embodiments, AI risk determination system 108 may transmit the risk assessment score to orchestration system 106 based on determining the risk assessment score. In some non-limiting embodiments, orchestration system 106 may determine whether the risk assessment score associated with the payment transaction involving the account of the user satisfies a risk assessment threshold. In some non-limiting embodiments, orchestration system 106 may perform an action based on determining that the risk assessment score associated with the payment transaction involving the account of the user satisfies the risk assessment threshold. In some non-limiting embodiments, orchestration system 106 may forego performing the action or a may perform a different action based on determining that the risk assessment score associated with the payment transaction involving the account of the user does not satisfy the risk assessment threshold. In some non-limiting embodiments, orchestration system 106 may transmit a message including an indication that the payment transaction is authorized based on determining that the risk assessment score associated with the payment transaction involving the account of the user satisfies the risk assessment threshold. Orchestration system 106 may transmit a message including an indication that the payment transaction is not authorized based on determining that the risk assessment score associated with the payment transaction involving the account of the user does not satisfy the risk assessment threshold.

Referring now to FIGS. 4A-4E, illustrated is a non-limiting embodiment of an implementation 400 of a process for generating code to retrieve aggregation data for machine learning models. As shown by reference number 415 in FIG. 4A, orchestration system 106 may receive an XML data file associated with a machine learning model. In some non-limiting embodiments, the XML data file includes data associated with one or more input parameters of a machine learning model. As shown by reference number 420 in FIG. 4A, code generator system 102 may receive the XML data file from orchestration system 106 based on orchestration system 106 transmitting the XML data file to code generator system 102.

Figure 4A:
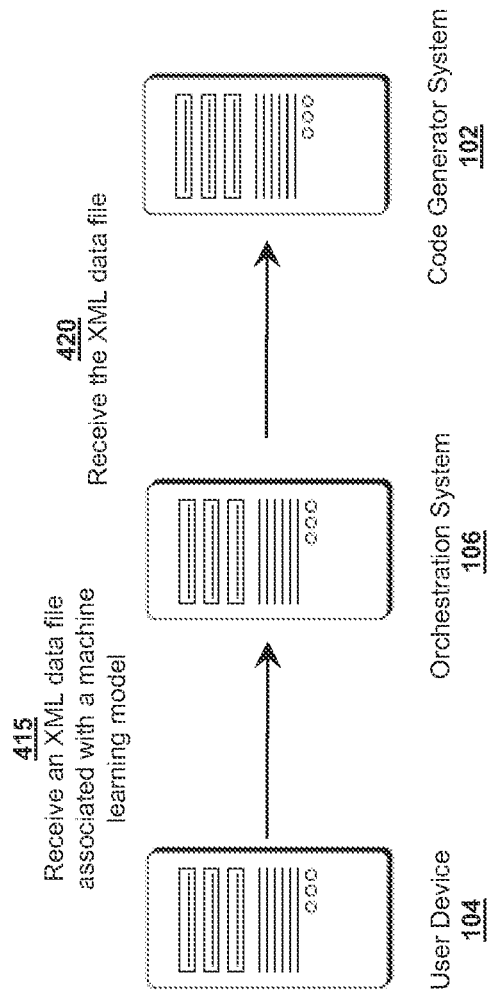
Figure 4B:
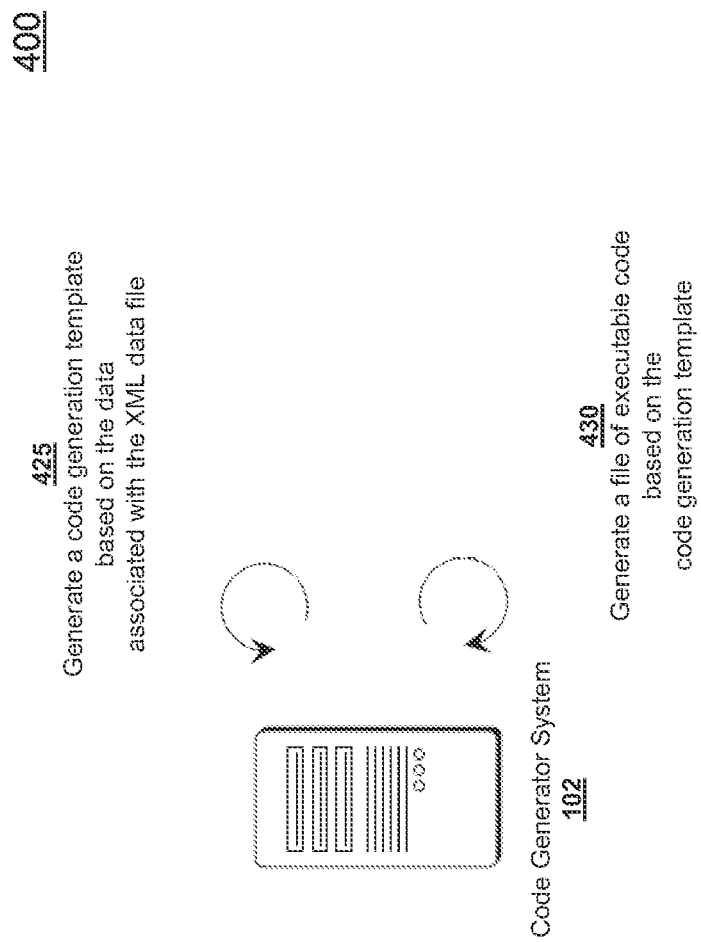

As shown by reference number 425 in FIG. 4B, code generator system 102 may generate a code generation template based on the data associated with one or more input parameters of the machine learning model included in the XML data file. In some non-limiting embodiments, the code generation template comprises one or more keys associated with one or more parameters of a transaction aggregate for an account of a user and the one or more parameters of the transaction aggregate for the account of the user may be based on one or more parameters of a plurality of payment transactions involving the account of the user. As shown by reference number 430 in FIG. 4B, code generator system 102 may generate a file of executable code based on the code generation template. In some non-limiting embodiments, the file of executable code comprises instructions that, when executed by at least one processor, cause the at least one processor to retrieve transaction aggregate data associated with the transaction aggregate for the account of the user.

Figure 4C:
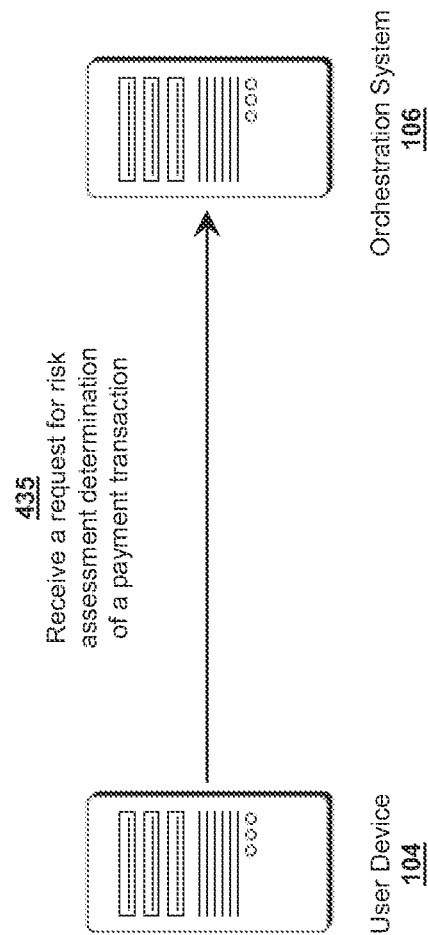

As shown by reference number 435 in FIG. 4C, orchestration system 106 may receive a request for risk assessment determination of a payment transaction (e.g., a real-time payment transaction) involving the account of the user from user device 104. As shown by reference number 440 in FIG. 4D, orchestration system 106 may retrieve transaction aggregate data associated with a transaction aggregate for the account of the user.

Figure 4E:
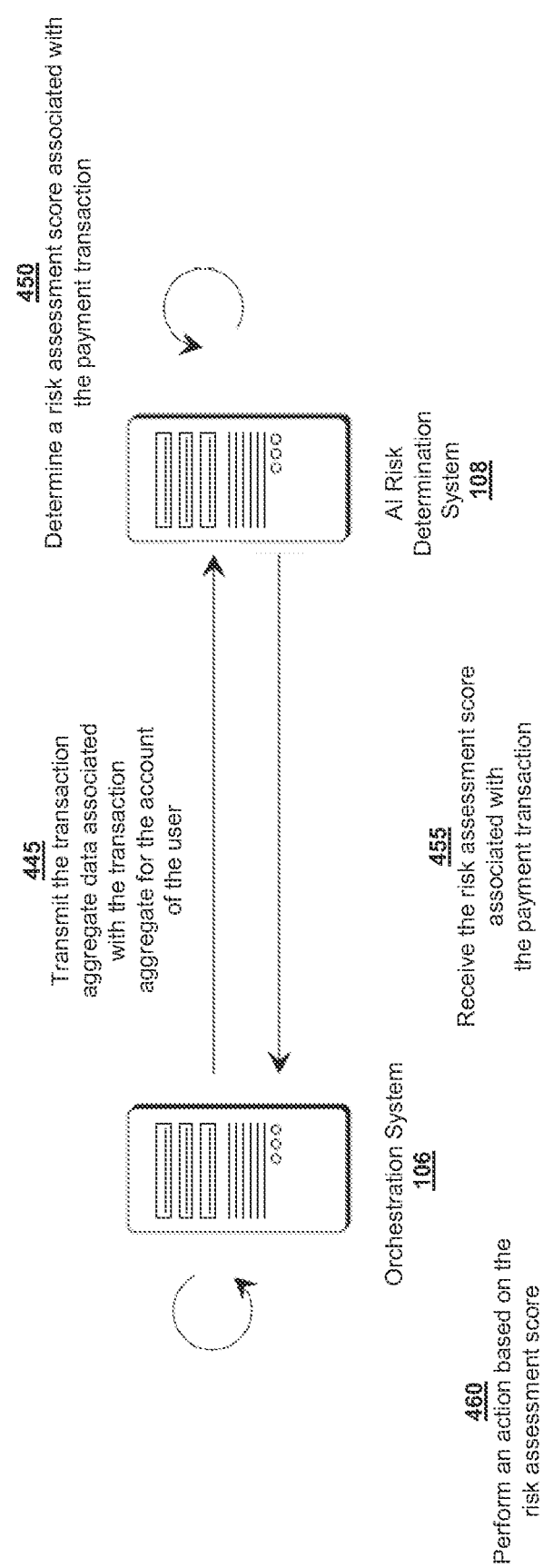

As shown by reference number 445 in FIG. 4E, orchestration system 106 may transmit the transaction aggregate data associated with the transaction aggregate for the account of the user to AI risk determination system 108. As shown by reference number 450 in FIG. 4E, AI risk determination system 108 may determine a risk assessment score associated with the payment transaction involving the account of the user based on the transaction aggregate data associated with the transaction aggregate. For example, AI risk determination system 108 may determine the risk assessment score associated with the payment transaction involving the account of the user using the transaction aggregate data associated with the transaction aggregate for the account of the user as an input to the machine learning model. As shown by reference number 455 in FIG. 4E, orchestration system 106 may receive the risk assessment score associated with the payment transaction involving the account of the user from AI risk determination system 108. As shown by reference number 460 in FIG. 4E, orchestration system 106 may perform an action based on the risk assessment score.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising:
at least one processor programmed or configured to:
receive a data file, wherein the data file comprises data associated with one or more input parameters of a machine learning model;
generate a code generation template based on the data associated with the one or more input parameters of the machine learning model included in the data file, wherein the code generation template comprises a template with fields based on the one or more input parameters of the machine learning model, wherein the code generation template comprises one or more keys associated with one or more parameters of a transaction aggregate for an account of a user, and wherein the one or more keys associated with the one or more parameters of the transaction aggregate for the account of the user corresponds to one or more features that were used to train and validate the machine learning model;
generate a file of executable code based on the code generation template, wherein the file of executable code comprises instructions that, when executed by at least one processor, cause at least one processor to retrieve data associated with the transaction aggregate for the account of the user; and
determine a risk assessment score associated with the payment transaction involving the account of the user using the data associated with the first transaction aggregate for the account of the user as an input to the machine learning model.

2. The system of claim 1, wherein the code generation template comprises a template for a database query, and wherein the template for the database query comprises the one or more keys associated with the one or more parameters of the transaction aggregate for the account of the user.

3. The system of claim 1, wherein, when generating the file of executable code, the at least one processor is programmed or configured to:
generate the file of executable code that, when executed by at least one processor, causes at least one processor to retrieve data associated with the transaction aggregate for the account of the user from a predetermined database of a plurality of databases.

4. The system of claim 1, wherein the at least one processor is further programmed or configured to:
receive a request for risk assessment determination of a payment transaction involving the account of the user from a client device;
retrieve data associated with a first transaction aggregate for the account of the user.

5. The system of claim 4, wherein, when retrieving data associated with the first transaction aggregate for the account of the user, the at least one processor is programmed or configured to:
retrieve short-term aggregation data associated with the first transaction aggregate for the account of the user from a short-term database; and
retrieve long-term aggregation data associated with the first transaction aggregate for the account of the user from a long-term database.

6. The system of claim 4, wherein, when retrieving the data associated with the first transaction aggregate for the account of the user, the at least one processor is programmed or configured to:
retrieve the data associated with the first transaction aggregate for the account of the user from one or more databases based on executing the file of executable code.

7. The system of claim 1, wherein, when receiving the data file, the at least one processor is programmed or configured to:
receive the data file via a web application, and wherein the data associated with the one or more input parameters of the machine learning model is based on data received via the web application.

8. A computer-implemented method, comprising:
receiving, with at least one processor, a data file, wherein the data file comprises data associated with one or more input parameters of a machine learning model;
generating, with at least one processor, a code generation template based on the data associated with the one or more input parameters of the machine learning model included in the data file, wherein the code generation template comprises a template with fields based on the one or more input parameters of the machine learning model, wherein the code generation template comprises one or more keys associated with one or more parameters of a transaction aggregate for an account of a user, and wherein the one or more keys associated with the one or more parameters of the transaction aggregate for the account of the user corresponds to one or more features that were used to train and validate the machine learning model;
generating, with at least one processor, a file of executable code based on the code generation template, wherein the file of executable code comprises instructions that, when executed by at least one processor, cause at least one processor to retrieve data associated with the transaction aggregate for the account of the user; and
determining a risk assessment score associated with the payment transaction involving the account of the user using the data associated with the first transaction aggregate for the account of the user as an input to the machine learning model.

9. The computer-implemented method of claim 8, wherein generating the file of executable code comprises:
generating the file of executable code that, when executed by at least one processor, causes at least one processor to retrieve transaction aggregate data associated with the transaction aggregate for the account of the user from a predetermined database of a plurality of databases.

10. The computer-implemented method of claim 8, further comprising:
receiving a request for risk assessment determination of a payment transaction involving the account of the user from a client device;
retrieving data associated with a first transaction aggregate for the account of the user.

11. The computer-implemented method of claim 10, wherein retrieving data associated with the first transaction aggregate for the account of the user comprises:
retrieving short-term aggregation data associated with the first transaction aggregate for the account of the user from a short-term database; and
retrieving long-term aggregation data associated with the first transaction aggregate for the account of the user from a long-term database.

12. The computer-implemented method of claim 10, wherein retrieving the data associated with the first transaction aggregate for the account of the user comprises:

retrieving the data associated with the first transaction aggregate for the account of the user from one or more databases based on executing the file of executable code.

13. The computer-implemented method of claim 10, further comprising:
determining whether the risk assessment score associated with the payment transaction involving the account of the user satisfies a risk assessment threshold; and
performing an action based on determining that the risk assessment score associated with the payment transaction involving the account of the user satisfies a risk assessment threshold.

14. The computer-implemented method of claim 8, wherein receiving the data file comprises:
receiving the data file via a web application, and wherein the data associated with the one or more input parameters of the machine learning model is based on data received via the web application.

15. A computer program product comprising at least one non-transitory computer-readable medium comprising one or more instructions that, when executed by at least one processor, cause the at least one processor to:
receive a data file associated with a machine learning model;
generate a code generation template based on receiving the data file associated with the machine learning model, wherein the code generation template comprises a template with fields based on one or more input parameters of the machine learning model, wherein the code generation template comprises one or more keys associated with one or more parameters of a transaction aggregate for an account of a user, and wherein the one or more keys associated with the one or more parameters of the transaction aggregate for the account of the user corresponds to one or more features that were used to train and validate the machine learning model; and
generate a file of executable code based on the code generation template, wherein the file of executable code comprises instructions that, when executed by at least one processor, cause at least one processor to retrieve data associated with the transaction aggregate for the account of the user; and
determine a risk assessment score associated with the payment transaction involving the account of the user using the data associated with the first transaction aggregate for the account of the user as an input to the machine learning model.

16. The computer program product of claim 15, wherein the code generation template comprises a template for a database query, and wherein the template for the database query comprises the one or more keys associated with the one or more parameters of the transaction aggregate for the account of the user.

17. The computer program product of claim 16, wherein, the one or more instructions that cause the at least one processor to generate the file of executable code, cause the at least one processor to:
generate the file of executable code that, when executed by at least one processor, causes at least one processor to retrieve data associated with the transaction aggregate for the account of the user from a predetermined database of a plurality of databases.

18. The computer program product of claim 17, wherein the one or more instructions further cause the at least one processor to:
receive a request for risk assessment determination of a payment transaction involving the account of the user from a client device;
retrieve data associated with a first transaction aggregate for the account of the user.

19. The computer program product of claim 18, wherein, the one or more instructions that cause the at least one processor to retrieve the data associated with the first transaction aggregate for the account of the user, cause the at least one processor to:
retrieve short-term aggregation data associated with the first transaction aggregate for the account of the user from a short-term database; and
retrieve long-term aggregation data associated with the first transaction aggregate for the account of the user from a long-term database.

20. The computer program product of claim 15, wherein, the one or more instructions that cause the at least one processor to receive the data file, cause the at least one processor to:
receive the data file via a web application, and wherein the data associated with the one or more input parameters of the machine learning model is based on data received via the web application.

* * * * *